US006914380B2

(12) United States Patent
Uemura et al.

(10) Patent No.: US 6,914,380 B2
(45) Date of Patent: Jul. 5, 2005

(54) VACUUM FLUORESCENT DISPLAY HAVING X-RAY SHIELDING CAP

(75) Inventors: Sashiro Uemura, Mie (JP); Takeshi Nagasako, Mie (JP); Junko Yotani, Mie (JP); Hiroyuki Kurachi, Mie (JP); Hiromu Yamada, Mie (JP); Tomotaka Ezaki, Mie (JP)

(73) Assignee: Noritake Co., Ltd,, Aichi (JP)

( * ) Notice: Subject to any disclaimer, the term of this patent is extended or adjusted under 35 U.S.C. 154(b) by 264 days.

(21) Appl. No.: 09/938,698

(22) Filed: Aug. 23, 2001

(65) Prior Publication Data

US 2002/0024290 A1 Feb. 28, 2002

(30) Foreign Application Priority Data

Aug. 23, 2000 (JP) .......................... 2000-252315

(51) Int. Cl.[7] .......................... H01J 29/18; H01J 31/00; H01J 29/86
(52) U.S. Cl. .......................... 313/497; 313/35; 313/36
(58) Field of Search .......................... 313/495–497, 313/461, 477 R, 311, 479, 35–36, 44, 46, 2.1, 478, 474, 309, 336, 371, 45, 351; 348/825

(56) References Cited

U.S. PATENT DOCUMENTS

| 4,568,852 | A | | 2/1986 | Kobayashi et al. | |
|---|---|---|---|---|---|
| 4,840,471 | A | * | 6/1989 | Mitani et al. | 359/722 |
| 5,466,990 | A | * | 11/1995 | Winsor | 315/56 |
| 5,537,167 | A | * | 7/1996 | Toide et al. | 353/100 |
| 5,877,583 | A | * | 3/1999 | Meglio et al. | 313/35 |
| 6,066,914 | A | * | 5/2000 | Shimizu et al. | 313/477 R |
| 6,097,138 | A | * | 8/2000 | Nakamoto | 313/309 |
| 6,130,497 | A | * | 10/2000 | Takezawa et al. | 313/35 |
| 6,239,547 | B1 | * | 5/2001 | Uemura et al. | 313/495 |
| 6,361,391 | B2 | * | 3/2002 | Cathey et al. | 445/24 |

FOREIGN PATENT DOCUMENTS

| JP | 11-162333 | 6/1999 |
|---|---|---|
| JP | 11-167886 | 6/1999 |
| JP | 11-329311 | 11/1999 |
| JP | 2000-149765 | 5/2000 |
| JP | 2000-156185 | 6/2000 |

* cited by examiner

Primary Examiner—Karabi Guharay
(74) Attorney, Agent, or Firm—Blakely Sokoloff Taylor & Zafman

(57) ABSTRACT

A vacuum fluorescent display includes a cathode electrode, grid electrode, anode electrode, at least one envelope, phosphor screen, and cap. The cathode electrode emits electrons. The grid electrode extracts the electrons from the cathode electrode. The anode electrode accelerates the electrons extracted from the cathode electrode. The envelope accommodates the cathode electrode, grid electrode, and anode electrode in a vacuum space and has a phosphor screen plate having light transmission properties. The phosphor screen is formed on an inner surface of the phosphor screen plate of the envelope and adapted to emit light upon bombardment of the electrons accelerated by the anode electrode. The cap is made of an X-ray shielding material and supported outside the envelope so as to surround the phosphor screen plate of the envelope through a gap. The cap has a light exit portion from which the light emitted from the phosphor screen emerges through the phosphor screen plate of the envelope.

4 Claims, 2 Drawing Sheets

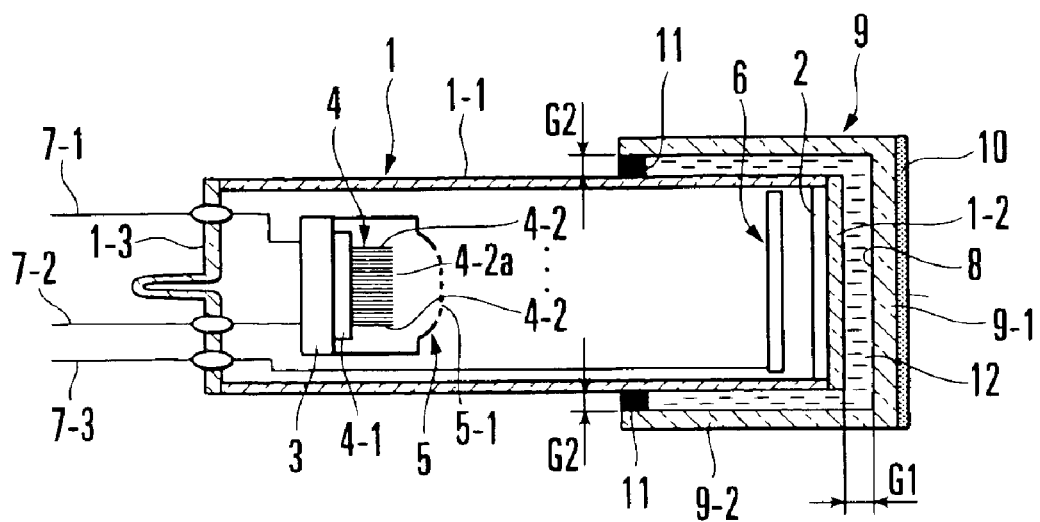
F I G. 1

VACUUM FLUORESCENT DISPLAY HAVING X-RAY SHIELDING CAP

BACKGROUND OF THE INVENTION

The present invention relates to a vacuum fluorescent display with phosphors that emit light upon bombardment of electrons.

Conventionally, a vacuum fluorescent display of this type has an envelope constituting a display surface which has at least partly light transmission properties. A phosphor layer is formed by applying phosphors to the inner side of the display surface of this envelope. A cathode electrode for emitting electrons toward the phosphor layer, a grid electrode for extracting the electrons from the cathode electrode, and an anode electrode for accelerating the electrons extracted from the cathode electrode are arranged in the vacuum space in the envelope. The electrons extracted from the cathode electrode by the grid electrode are accelerated by the anode electrode and bombard against the phosphor layer. Hence, the phosphors that form the phosphor layer are excited by the impact of the electrons, and the phosphor layer emits light in a color corresponding to the excited phosphor. The light emitted from the phosphor layer emerges from the display surface through an optical film.

At this time, if a high voltage is applied to the anode electrode, the electrons accelerated to a high speed bombard against the phosphor layer to increase the luminance. When the electrons bombard, however, the temperature of the phosphor layer increases sharply, and the luminance decreases sharply. Since the bombarding electrons have a high energy, the amount of X-rays generated by the phosphor layer increases, and the X-ray undesirably leak to the outside from the display surface.

In order to suppress this sharp temperature increase and generation of the X-rays of the phosphor layer, conventionally, the voltage to be applied to the anode electrode is suppressed low. When the voltage to be applied to the anode decreases, however, high-luminance light cannot be obtained.

In some projection type cathode ray tube, a countermeasure for preventing leakage of X-rays with a thick vacuum envelope and a countermeasure for preventing overheat of the phosphor layer with a liquid cooling mechanism are taken separately. In this case, the cathode ray tube becomes large in size and weight, so it cannot be employed in a small-size vacuum fluorescent display. In order to prevent X-ray leakage, the display surface (phosphor screen plate) of the envelope may be made of lead glass. In this case, however, a blackening phenomenon is caused by heat. Thus, the display surface of the envelope cannot be made of lead glass.

SUMMARY OF THE INVENTION

It is an object of the present invention to provide a vacuum fluorescent display in which X-ray leakage and overheat of the phosphor layer are prevented with a simple structure.

It is another object of the present invention to provide a vacuum fluorescent display in which a voltage to be applied to the anode electrode is increased so that high-luminance light can be obtained.

In order to achieve the above objects, according to the present invention, there is provided a vacuum fluorescent display comprising a cathode electrode for emitting electrons, a grid electrode for extracting the electrons from the cathode electrode, an anode electrode for accelerating the electrons extracted from the cathode electrode, at least one envelope which accommodates the cathode electrode, the grid electrode, and the anode electrode in a vacuum space and has a display portion having light transmission properties, a phosphor layer formed on an inner surface of the display portion of the envelope and adapted to emit light upon bombardment of the electrons accelerated by the anode electrode, and a cap made of an X-ray shielding material and supported outside the envelope so as to surround the display portion of the envelope through a gap, the cap having a light exit surface from which the light emitted from the phosphor layer emerges through the display portion of the envelope.

BRIEF DESCRIPTION OF THE DRAWINGS

FIG. 1 is a sectional view showing the schematic arrangement of a vacuum fluorescent display according to the first embodiment of the present invention;

DESCRIPTION OF THE PREFERRED EMBODIMENTS

Figure 2A:
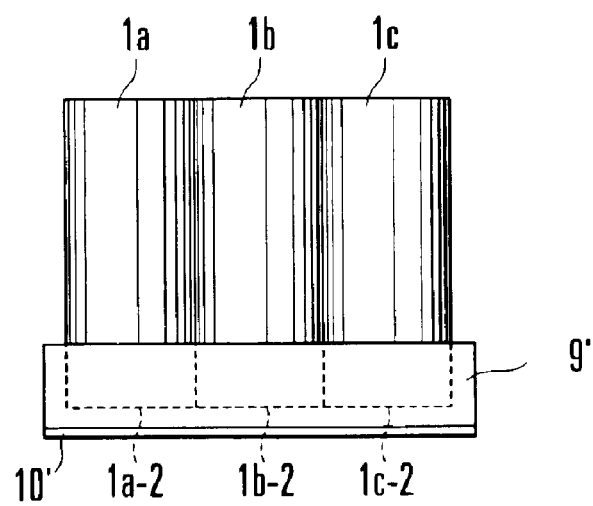
FIGS. 2A and 2B are front and plan views, respectively, showing an example in which the cap shown in FIG. 1 is applied to a tricolor display.

The present invention will be described in detail with reference to the accompanying drawings.

FIG. 1 shows a vacuum fluorescent display according to the first embodiment of the present invention, which is a field emission type lamp. Referring to FIG. 1, the inner space of an envelope 1 is maintained at vacuum. The envelope 1 is comprised of a cylindrical glass bulb 1-1, a circular phosphor screen plate (display surface) 1-2 fixed to the front surface-side opening of the glass bulb 1-1 by adhesion, and a circular glass stem 1-3 fixed to the rear surface-side opening of the glass bulb 1-1 by adhesion. The glass bulb 1-1 has a thickness of 2 mm. The phosphor screen plate 1-2 is made of 4-mm thick white glass having light transmission properties. The envelope 1, i.e., the glass bulb 1-1, has a diameter of about 3 cm and a length of about 10 cm.

Phosphors are applied to the inner surface of the phosphor screen plate 1-2 to form a phosphor screen 2 formed of a phosphor layer. In the envelope 1, a ceramic substrate 3 is arranged close to the glass stem 1-3, and a cathode electrode 4 is mounted on the phosphor screen 2 side of the ceramic substrate 3. The cathode electrode 4 is comprised of an electrode 4-1 and a large number of graphite columns 4-2 fixed to the electrode 4-1 with a conductive adhesive. Each graphite column 4-2 is made of an aggregate of carbon nanotubes, and has a needle-like shape with a length of several $\mu$m to several mm. A grid electrode 5 with a mesh portion 5-1 is arranged between the cathode electrode 4 and phosphor screen 2 to cover the graphite columns 4-2. An anode electrode 6 is arranged, close to the phosphor screen 2, between the phosphor screen 2 and grid electrode 5.

Figure 3A:
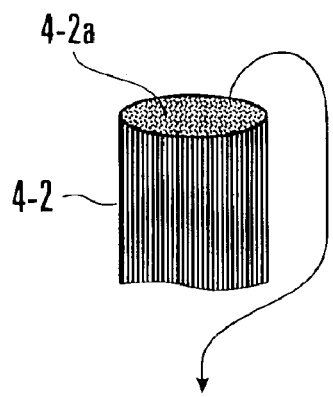
FIG. 3A is a sectional perspective view of a graphite column.
Figure 3B:
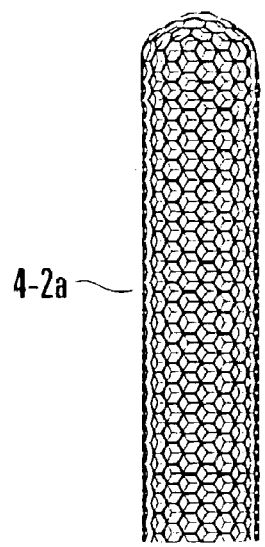
FIG. 3B is an enlarged front view of a carbon nanotube constituting the graphite column shown in FIG. 3A.
Figure 3C:
FIG. 3C is an enlarged front view of the tip of the carbon nanotube shown in FIG. 3B.

The structure of the cathode electrode 4 is described in detail in U.S. Pat. No. 6,239,547 (reference 1) and Japanese Patent Laid-Open No. 2000-149765 (reference 2) applied by the present applicant. A graphite column 4-2 described in references 1 and 2 is made of an aggregate structure of carbon nanotubes 4-2a directed in almost the same directions, as shown in FIG. 3A. As shown in FIG. 3B, each carbon nanotube 4-2a is completely graphitized and cylindrical, and has a diameter of about 4 nm to 50 nm and a length on the order of 1 μm. FIG. 3C shows the tip of the carbon nanotube 4-2a in enlargement.

When DC arc discharge is caused in helium gas between two carbon electrodes separated from each other by about 1 mm to 2 mm, carbon of the anode is evaporated and agglomerated to form a deposit at the tip of the cathode-side carbon electrode, where the carbon nanotubes 4-2a are formed. In other words, when stable arc discharge is maintained in helium gas with the gap between the carbon electrodes being held at about 1 mm, a columnar deposit with almost the same diameter as that of the carbon electrode of the anode is formed at the tip of the cathode.

The columnar deposit is formed of two regions, i.e., an outer hard shell and an inner fragile black core. The inner core is comprised of graphite columns with fibrous tissues extending in the longitudinal direction of the deposit column. When the deposit column is cut, the graphite columns 4-2 can be obtained. The outer hard shell is made of graphite polycrystals.

In the graphite column 4-2, carbon nanopolyhedrons as well as a plurality of carbon nanotubes form an aggregate. Carbon nanotubes are classified into those with a structure in which a single graphite layer is cylindrically closed, as schematically shown in FIG. 3C, and those with a coaxial multilayered structure in which a plurality of graphite layers stacked to form a telescopic structure are cylindrically closed. The central portion of each structure is hollow.

When a voltage is applied across the cathode electrode 4 and grid electrode 5 through lead pins 7-1 and 7-2, a high electric field is concentrated to the tips of the carbon nanotubes 4-2a of the graphite columns 4-2 fixed on the electrode 4-1. Hence, electrons are extracted from the tips of the carbon nanotubes 4-2a and are emitted from the mesh portion 5-1.

A high voltage higher than the potential of the grid electrode 5 is applied to the anode electrode 6, arranged closer to the phosphor screen 2 than to the grid electrode 5, through a lead pin 7-3. The electrons from the cathode electrode 4 which are emitted from the mesh portion 5-1 are accelerated by the anode electrode 6 and bombard against the phosphor screen 2. Hence, the phosphors that form the phosphor screen 2 are excited by electron impact, and the phosphor screen 2 emits light in a color corresponding to the excited phosphor. The light emitted by the phosphor screen 2 is transmitted through the phosphor screen plate 1-2.

A bottomed cylindrical cap 9 made of lead glass is attached to the front side of the envelope 1 through a gap 8 so as to surround the phosphor screen plate 1-2. More specifically, almost ⅓ of the region covering the phosphor screen plate 1-2 and glass bulb 1-1 continuous to the phosphor screen plate 1-2 is covered by the cap 9. The cap 9 is 3-mm thick. A light exit portion 9-1 as the bottom of the cap 9 has a flat inner surface and outer surface (light exit surface). Light emitted from the phosphor screen 2 and transmitted through the phosphor screen plate 1-2 emerges from the light exit surface of the light exit portion 9-1. An optical film 10 for increasing the color purity of the exit light is adhered to the light exit surface of the light exit portion 9-1.

A gap G1 is formed between the light exit portion 9-1 and phosphor screen plate 1-2, and a gap G2 is formed between the inner surface of the cylindrical portion 9-2 of the cap 9 and the outer surface of the glass bulb 1-1. The gap 8 is comprised of the gaps G1 and G2. A transparent cooling liquid 12 such as water is sealed in the gap 8. The cooling liquid 12 is sealed in the gap 8 by closing a portion between the inner surface of the tip of a cylindrical portion 9-2 of the cap 9 and the outer surface of the glass bulb 1-1 with a silicone adhesive 11 in a ring-like shape. The gaps G1 and G2 are 2-mm width each.

Light emitted from the phosphor screen 2 is transmitted through the phosphor screen plate 1-2 and emerges outside through the gap 8 (cooling liquid 12) → light exit portion 9-1 of the cap 9 → optical film 10. Heat of the phosphor screen 2 is absorbed by the cooling liquid 12 in the gap 8. Thus, sharp temperature increase of the phosphor screen 2 is prevented, and high-luminance light can be obtained by increasing the voltage to be applied to the anode electrode 6. When the thickness of the phosphor screen plate 1-2 is decreased, the cooling effect of the phosphor screen 2 is further enhanced.

The display of this embodiment was compared with a conventional field emission type lamp having no cap 9. According to this embodiment, the luminance decrease rate when the luminance was high due to temperature increase of the phosphor screen 2 was ¹/₁₀ that of the conventional field emission type lamp. Since the phosphor screen 2 is cooled by the cooling liquid 12 in the gap 8, the blackening phenomenon of the cap 9 made of lead glass, which is caused by temperature increase of the cap 9, is prevented. Since heat deterioration of the optical film 10 is also prevented, high-luminance, stable light emission can be obtained with a high color purity.

The X-rays generated by the phosphor screen 2 are transmitted through the gap 8 (cooling liquid 12) and tend to leak outside through the light exit portion 9-1 of the cap 9. Since the cap 9 is made of lead glass, the X-rays are shielded by the cap 9. X-rays which tend to leak from the glass bulb 1-1 are also shielded by the cylindrical portion 9-2 of the cap 9. Thus, the total amount of X-rays leaking outside is very small.

As described above, according to this embodiment, X-ray leakage prevention and overheat prevention of the phosphor screen can be achieved with a simple arrangement in which the cap 9 made of lead glass is applied to the front surface of the envelope 1 and the cooling liquid 12 is sealed in the gap 8 between the cap 9 and envelope 1. As a result, the voltage to be applied to the anode electrode 6 is increased, so that high-luminance light can be obtained.

The amount of cooling liquid 12 to be sealed in the gap 8 is determined considering thermal expansion of the cooling liquid 12. The volume of the gap 8 can be freely adjusted by altering the sizes of the gaps G1 and G2. More specifically, the amount of cooling liquid 12 and the volume of the gap 8 can be freely set. The pressure in the gap 8 which increases due to thermal expansion of the cooling liquid 12 is absorbed by the soft silicone adhesive 11 that seals the gap 8. In place of the silicone adhesive 11, a fluororubber packing may be used.

Although the cooling liquid 12 is sealed in the gap 8 in the above embodiment, the cooling liquid 12 need not always be sealed. When the cooling liquid 12 is not sealed, heat of the phosphor screen 2 is dissipated from the cap 9 through the gap 8 between the phosphor screen plate 1-2 of the envelope 1 and the cap 9. In this case, the phosphor screen 2 is cooled not by water but by air to achieve overheat prevention. At this time, the gap 8 need not be completely sealed by the silicone adhesive 11 so the gap 8 and the outside can communicate with each other.

In the above embodiment, the cap 9 is made of lead glass. However, the present invention is not limited to this, and the cap 9 can be made of any X-ray shielding material. The cooling liquid 12 is not limited to water. For example, a liquid mixture of ethylene glycol and diethylene glycol may be employed. The cathode electrode 4 is an electrode using carbon nanotubes. However, the cathode electrode 4 is not limited to an electrode using carbon nanotubes.

Figure 2B:
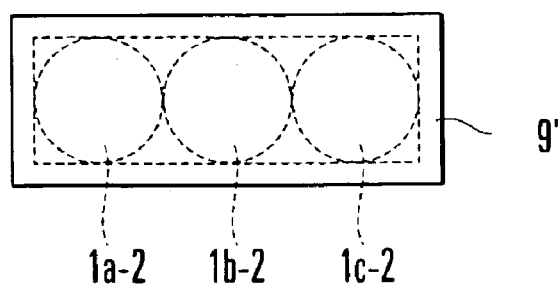

In the above embodiment, the present invention is applied to a display that emits light of one color. Alternatively, the present invention can also be applied to a display that emits light of three colors. FIGS. 2A and 2B schematically show a case wherein the present invention is applied to a tricolor display. In FIG. 2A, a common cap 9' is formed on the front sides of envelopes 1a, 1b, and 1c of three vacuum fluorescent display tubes corresponding to the three colors.

More specifically, caps 9 are not provided to the envelopes 1a, 1b, and 1c separately, but one cap 9' covers phosphor screen plates 1a-2, 1b-2, and 1c-2 of the envelopes 1a, 1b, and 1c. An optical film 10' is adhered to the light exit surface of the cap 9'. The cap 9' is formed of lead glass into a box-like shape and has the rectangular light exit surface. A cooling liquid is sealed in the gap between the cap 9' and the envelopes 1a, 1b, and 1c by using a silicone adhesive.

Figure 4:
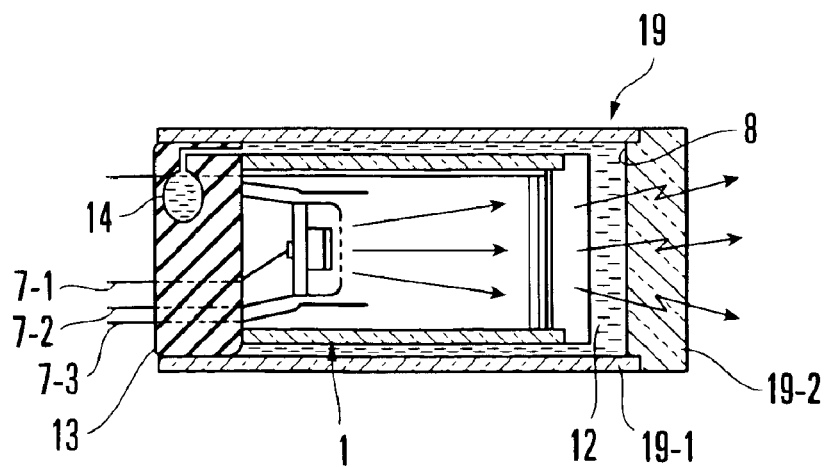
FIG. 4 is a sectional view of a light source tube according to the second embodiment of the present invention.

The second embodiment of the present invention will be described with reference to FIG. 4.

With a local shield structure, when a high voltage is applied, sometimes spark occurs and stable driving operation becomes difficult to perform. Since the lead pins are not shielded, when a high voltage is applied, sometimes discharge occurs between the pins. Also, for example, since the display is not shielded from the external electric field, high-voltage driving is difficult to perform. A light source tube according to the second embodiment has an electron source formed of carbon nanotubes or carbon nanofibers, and is provided with an X-ray shield mechanism and cooling structure.

The X-ray shield mechanism is formed of a cap 19 having a cylindrical X-ray barrier 19-1 covering the envelope 1 excluding the electrode portions, and a front surface glass member 19-2 made of lead glass and fitted in one opening of the X-ray barrier 19-1 to correspond to the light exit surface of the light source tube. Alternatively, the X-ray barrier 19-1 is made of lead glass, or an X-ray shielding material without any light transmission properties. The cap 19 is arranged to form a gap 8 with the envelope 1.

The cooling mechanism is made up from the gap 8 formed between the envelope 1 and cap 19, and a cooling liquid 12, e.g., oil, sealed in the gap 8. With this arrangement, the entire light source tube is covered with the cooling liquid 12.

Therefore, the light source tube is shielded from the external electric field. Even when a high voltage is applied, the light source tube can perform stable electron beam driving operation. A high voltage of 30 kV to 40 kV can also be applied to the anode, and the front surface (phosphor screen) of the light source tube is cooled, so that a higher luminance can be obtained.

The cooling liquid 12 is sealed by a sealing member (stem) 13 made of an insulating material such as silicone rubber. The outer diameter of the sealing member 13 is slightly larger than that of the envelope 1. When the cooling liquid 12 is sealed with insulating silicone rubber, the light source tube and the cap 19 can be fixed to each other without adversely affecting the outer shape of the cap 19 (shield glass tube) that covers the envelope 1 of the light source tube, and the cooling liquid 12 can be sealed in the gap between the envelope 1 of the light source tube and the cap 19.

Various types of lead pins 7-1 to 7-3 are buried and fixed in the sealing member 13. When the various types of lead pins 7-1 to 7-3 are buried and fixed with an insulating sealing member in this manner, discharge among the lead pins 7-1 to 7-3 can be prevented, and a lead wire can be extended stably even under a high-voltage condition.

Furthermore, a liquid reservoir 14 communicating with the gap 8 may be formed in the sealing member 13. This can absorb a change in volume caused by thermal expansion of the cooling liquid 12. When such a liquid reservoir 14 is formed in the sealing member 13, the sealing member 13 preferably has elasticity.

In this embodiment, the front surface glass member 19-2 constituting the X-ray shielding structure is not limited to a flat glass member but may form a convex or concave surface. The distance between the front surface glass member 19-2 of the X-ray shielding structure and the front surface glass member (phosphor screen plate 1-2) of the light source tube can be set arbitrarily.

As has been described above, according to the present invention, a cap having light transmission properties and made of an X-ray shielding material is arranged outside the envelope to surround the display surface while forming a gap with the envelope. Therefore, X-ray leakage prevention and overheat prevention of the phosphor screen can be achieved with a simple structure. Simultaneously, high-luminance light can be obtained by increasing the voltage to be applied to the anode electrode.

Since the cooling liquid is sealed in the gap, the effect of preventing overheat of the phosphor screen can be enhanced. Since the cap is formed of lead glass, the effect of preventing X-ray leakage can be enhanced.

What is claimed is:

1. A vacuum fluorescent display comprising:
    a cathode electrode for emitting electrons; a grid electrode for extracting the electrons from said cathode electrode; an anode electrode for accelerating the electrons extracted from said cathode electrode; at least one envelope which accommodates said cathode electrode, said grid electrode, and said anode electrode in a vacuum space and has a display portion having light transmission properties, a phosphor layer formed on an inner surface of the display portion of said envelope and adapted to emit light upon bombardment of the electrons accelerated by said anode electrode; and a cap made of an X-ray shielding material and supported outside said envelope so as to surround the display portion of said envelope through a gap, said cap having a light exit surface from which the light emitted from said phosphor layer emerges through the display portion of said envelope, wherein said cap surrounds said envelope entirely; wherein said envelope has a stem in which a plurality of lead pins to be connected to said electrodes are buried and which has an outer diameter slightly larger than that of said envelope, and a portion between a tip of an opening of said cap and said envelope is sealed by the stem to form the gap, wherein said stem is made of an insulating elastic material; a cooling liquid sealed in the gap and a liquid reservoir formed in the stem to communicate with the gap.

2. A vacuum fluorescent display comprising:

a cathode electrode for emitting electrons;

a grid electrode for extracting the electrons from said cathode electrode;

an anode electrode for accelerating the electrons extracted from said cathode electrode at least one envelope which accommodates said cathode electrode, said grid electrode, and said anode electrode in a vacuum space and has a display portion having light transmission properties;

a phosphor layer formed on an inner surface of the display portion of said envelope and adapted to emit light upon bombardment of the electrons accelerated by said anode electrode; and a cap made of an X-ray shielding material and supported outside said envelope so as to surround the display portion of said envelope through a gap, said cap having a light exit surface from which the light emitted from said phosphor layer emerges through the display portion of said envelope, wherein said envelope comprises a plurality of envelopes corresponding to a plurality of colors, and said cap surrounds display portions of the plurality of envelopes all together.

3. A vacuum fluorescent display comprising:

a cathode electrode for emitting electrons; a grid electrode for extracting the electrons from said cathode electrode; an anode electrode for accelerating the electrons extracted from said cathode electrode; at least one envelope which accommodates said cathode electrode, said grid electrode, and said anode electrode in a vacuum space, wherein the envelope comprises a display portion having light transmission properties, a phosphor layer formed on an inner surface of the display portion of said envelope and adapted to emit light upon bombardment of the electrons accelerated by said anode electrode; and a cap made of an X-ray shielding material and supported outside said envelope so as to surround the display portion of said envelope through a gap, said cap having a light exit surface from which the light emitted from said phosphor layer emerges through the display portion of said envelope and having a cylindrical-shaped bottom to cover the display portion of the envelope and a side surface of the envelope, a stem in which a plurality of lead pins to be connected to said electrodes are buried and which has an outer diameter slightly larger than that of said envelope, and a portion between a tip of an opening of said cap and said envelope is sealed by the stem to form the gap; wherein said cap surrounds said envelope entirely.

4. A display according to claim 3, wherein said stem is made of an insulating elastic material.

* * * * *